(12) United States Patent
Kato et al.

(10) Patent No.: US 9,844,927 B2
(45) Date of Patent: Dec. 19, 2017

(54) MULTI-LAYERED CONTAINER

(71) Applicant: Mitsubishi Gas Chemical company, Inc., Tokyo (JP)

(72) Inventors: Tomonori Kato, Kanagawa (JP); Nobuhide Tsunaka, Kanagawa (JP); Takafumi Oda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 8 days.

(21) Appl. No.: 15/100,938

(22) PCT Filed: Nov. 20, 2014

(86) PCT No.: PCT/JP2014/080821
§ 371 (c)(1),
(2) Date: Jun. 1, 2016

(87) PCT Pub. No.: WO2015/083559
PCT Pub. Date: Jun. 11, 2015

(65) Prior Publication Data
US 2016/0303834 A1    Oct. 20, 2016

(30) Foreign Application Priority Data

Dec. 5, 2013   (JP) .................................. 2013-251829

(51) Int. Cl.
| | |
|---|---|
| B32B 27/08 | (2006.01) |
| B32B 27/18 | (2006.01) |
| B32B 27/34 | (2006.01) |
| B32B 27/20 | (2006.01) |
| B32B 27/32 | (2006.01) |
| B32B 27/36 | (2006.01) |
| B65D 81/26 | (2006.01) |
| B29C 51/00 | (2006.01) |
| B29C 51/14 | (2006.01) |

(52) U.S. Cl.
CPC .............. B32B 27/08 (2013.01); B32B 27/18 (2013.01); B32B 27/20 (2013.01); B32B 27/32 (2013.01); B32B 27/34 (2013.01); B32B 27/36 (2013.01); B65D 81/266 (2013.01); B29C 51/002 (2013.01); B29C 51/14 (2013.01); B32B 2250/03 (2013.01); B32B 2307/724 (2013.01); B32B 2307/7242 (2013.01); B32B 2439/60 (2013.01); B32B 2439/70 (2013.01); B32B 2439/80 (2013.01)

(58) Field of Classification Search
CPC . B32B 27/34; C08G 69/265; Y10T 428/1352; Y10T 428/1393; Y10T 428/31725
USPC .............................. 428/35.7, 34.1, 36.6, 36.7
See application file for complete search history.

(56) References Cited

U.S. PATENT DOCUMENTS

| | | |
|---|---|---|
| 5,849,380 A | 12/1998 | Kashiba et al. |
| 2004/0076781 A1 | 4/2004 | Kanada et al. |
| 2004/0230028 A1 | 11/2004 | Sato et al. |
| 2009/0074929 A1 | 3/2009 | Kato et al. |
| 2010/0304164 A1 | 12/2010 | Sato et al. |
| 2012/0082861 A1 | 4/2012 | Sato et al. |
| 2012/0263962 A1 | 10/2012 | Sato et al. |
| 2013/0219836 A1 | 8/2013 | Sato et al. |

FOREIGN PATENT DOCUMENTS

| | | |
|---|---|---|
| CN | 1508008 A | 6/2004 |
| CN | 1322027 C | 6/2007 |
| CN | 101385564 A | 3/2009 |
| CN | 101522388 B | 8/2012 |
| JP | 2000-052415 A | 2/2000 |
| JP | 2000-273328 A | 10/2000 |
| JP | 2005-272535 A | 10/2005 |
| JP | 2006-131275 A | 5/2006 |
| JP | 3978542 B2 | 9/2007 |
| JP | 2011-032411 A | 2/2011 |

OTHER PUBLICATIONS

International Search Report dated Mar. 3, 2015 for PCT/JP2014/080821 and English translation of the same (4 pages).

*Primary Examiner* — Ellen S Wood
(74) *Attorney, Agent, or Firm* — Fitch, Even, Tabin & Flannery LLP

(57) ABSTRACT

A multilayer container having a layer configuration of 3 or more layers including, as layered in that order from an inner layer to an outer layer, an oxygen-permeable layer containing an oxygen-permeable resin as the main component thereof, an oxygen-absorbing adhesive layer containing, as the main components thereof, an oxygen-absorbing resin composition containing a deoxidant composition and a thermoplastic resin and an adhesive resin, and a gas-barrier layer containing a gas-barrier resin as the main component thereof, wherein the gas-barrier resin is a polyamide resin including a diamine unit containing a metaxylylenediamine unit in an amount of 70 mol % or more and a dicarboxylic acid unit containing 75 to 96 mol % of an $\alpha,\omega$-linear aliphatic dicarboxylic acid unit having 4 to 20 carbon atoms and 25 to 4 mol % of an aromatic dicarboxylic acid unit, the content of the deoxidant composition in the oxygen-absorbing adhesive layer is 5 to 50% by mass relative to 100% by mass of the material constituting the oxygen-absorbing adhesive layer, the content of the adhesive resin is 20 to 70% by mass relative to 100% by mass of the material constituting the oxygen-absorbing adhesive layer, and the thickness of the oxygen-absorbing adhesive layer is 10 to 30% of the total thickness of the multilayer container.

11 Claims, No Drawings

MULTI-LAYERED CONTAINER

CROSS-REFERENCE TO RELATED APPLICATIONS

This application is a U.S. national phase application filed under 35 U.S.C. §371 of International Application PCT/JP2014/080821, filed on Nov. 20, 2014, designating the United States, which claims priority from Japanese Application Number 2013-251829, filed Dec. 5, 2013, which are hereby incorporated herein by reference in their entirety.

TECHNICAL FIELD

The present invention relates to a multilayer container, and more specifically to a deoxygenating multilayer container.

BACKGROUND ART

As a packaging material for foods and the like having a yearly-based long shelf life, can has been used. In the case where foods and the like are stored by can, the can exhibit a potent effect for various gas-barrier properties against oxygen, water vapor and the like, but has some problems in that, before opened, the contents could not be visually confirmed, that the canned products could not be heated in a microwave oven, that the canned foods are difficult to take out when they are put in serving dishes or the like, and that the used cans could not be piled up for disposal after use and are therefore kept voluminous, that is, the can lacks in disposal aptitude.

Given the situation, application of plastic containers has become investigated also to the above-mentioned packaging containers that are required to have a long shelf life. As one example, a packaging container formed of a multilayer material container prepared by providing a deoxygenating resin layer containing a deoxidant composition incorporated therein around an already-existing gas-barrier container has been developed, wherein the gas-barrier performance of the container is improved and a deoxygenation function is imparted to the container itself.

PTL 1 discloses a deoxygenating packaging container formed by thermoforming a deoxygenating multilayer body that has an outer layer of a gas-barrier layer formed of a gas-barrier resin and an inner layer of an oxygen-permeable layer formed of an oxygen-permeable resin and, between the two, an interlayer of an oxygen-absorbing layer formed of a deoxidant composition-incorporated oxygen-absorbing resin composition, with the inner layer side kept inside the container, wherein the gas-barrier resin is a mixed resin of a polyamide or a polyamide copolymer, in which the content of the amide structure unit formed through polycondensation of metaxylylenediamine and adipic acid is 90 mol % or more, and an amorphous polyamide in a mixing ratio (mass %) of 80/20 to 30/70.

CITATION LIST

Patent Literature

PTL 1: Japanese Patent No. 3978542

SUMMARY OF INVENTION

Technical Problem

In the packaging container described in PTL 1, amorphous polyamide is incorporated in the gas-barrier layer in an amount of 20 to 70 mass %, from the viewpoint of molding processability from a sheet or film to the container. However, the packaging container is still insufficient in point of the oxygen-barrier performance and the oxygen absorbability thereof, and the oxygen-barrier performance and the oxygen absorbability are desired to be further improved.

The problem to be solved by the invention is to provide a multilayer container having oxygen-barrier performance and oxygen absorbability favorable for food packaging materials that are required thermal sterilization treatment, without worsening the outward appearance on thermoforming.

Solution to Problem

The present invention provides a multilayer container as described below.

<1> A multilayer container having a layer configuration of 3 or more layers including, as layered in that order from an inner layer to an outer layer, an oxygen-permeable layer (A) containing an oxygen-permeable resin as the main component thereof, an oxygen-absorbing adhesive layer (B) containing, as the main components thereof, an oxygen-absorbing resin composition (b1)) containing a deoxidant composition (b1-i) and a thermoplastic resin (b1-ii) and an adhesive resin (b2), and a gas-barrier layer (C) containing a gas-barrier resin as the main component thereof, wherein:

the gas-barrier resin is a polyamide resin (X) including a diamine unit containing a metaxylylenediamine unit in an amount of 70 mol % or more and a dicarboxylic acid unit containing 75 to 96 mol % of an $\alpha,\omega$-linear aliphatic dicarboxylic acid unit having 4 to 20 carbon atoms and 25 to 4 mol % of an aromatic dicarboxylic acid unit, the content of the deoxidant composition (b1-i) in the oxygen-absorbing adhesive layer (B) is 5 to 50% by mass relative to 100% by mass of the material constituting the oxygen-absorbing adhesive layer (B), and the content of the adhesive resin (b2) is 20 to 70% by mass relative to 100% by mass of the material constituting the oxygen-absorbing adhesive layer (B), and the thickness of the oxygen-absorbing adhesive layer (B) is 10 to 30% of the total thickness of the multilayer container.

<2> The multilayer container according to the above <1>, wherein an oxygen-absorbing adhesive layer (D) containing, as the main components thereof, an oxygen-absorbing resin composition (d1) containing a deoxidant composition (d1-i) and a thermoplastic resin (d1-ii) and an adhesive resin (d2) is layered as an outer layer of the gas-barrier layer (C), and a protective layer (E) containing a thermoplastic resin as the main component thereof is layered as an outer layer of the oxygen-absorbing adhesive layer (D).

<3> The multilayer container according to the above <1> or <2>, wherein the thickness of the oxygen-permeable layer (A) is 10 to 40% of the total thickness of the multilayer container.

<4> The multilayer container according to any one of the above <1> to <3>, wherein the thickness of the gas-barrier layer (C) is 2 to 20% of the total thickness of the multilayer container.

<5> The multilayer container according to any one of the above <1> to <4>, wherein the deoxidant composition (b1-i) for use in the oxygen-absorbing adhesive layer (B) is a deoxidant composition containing an iron powder as the main component thereof.

<6> The multilayer container according to the above <5>, wherein the maximum particle size of the iron powder is 0.3 mm or less, and the mean particle size thereof is 0.1 mm or less.

<7> The multilayer container according to any one of the above <1> to <6>, wherein the thermoplastic resin (b1-ii) for use in the oxygen-absorbing adhesive layer (B) is a resin containing polypropylene as the main component thereof.

<8> The multilayer container according to any one of the above <1> to <7>, wherein the thermoplastic resin (b1-ii) for use in the oxygen-absorbing adhesive layer (B) is a resin containing polypropylene as the main component thereof, and having received thermal history once or more in an extruder at a temperature not lower than the melting point of the resin.

<9> The multilayer container according to any one of the above <1> to <8>, wherein the oxygen-permeable resin for use in the oxygen-permeable layer (A) is a polypropylene resin.

<10> The multilayer container according to any one of the above <2> to <9>, wherein the thermoplastic resin for use in the protective layer (E) is at least one selected from the group consisting of a polypropylene resin, a polyamide resin and a polyester resin.

<11> The multilayer container according to any one of the above <2> to <10>, wherein the thickness of the protective layer (E) is 15 to 60% of the total thickness of the multilayer container.

In this description, the expression of "containing . . . as the main component" means that it contains the component in an amount of preferably 90 mass % or more, more preferably 95 mass % or more, even more preferably 98 mass % or more, and may contain any other component within a range not detracting from the advantageous effects of the present invention.

Advantageous Effects of Invention

The multilayer container of the present invention has oxygen-barrier performance and oxygen absorbability favorable for food packaging materials that are required thermal sterilization treatment, without worsening the outward appearance on thermoforming. In particular, the multilayer container of the present invention can realize excellent oxygen-barrier performance and oxygen absorbability though reducing the number of the layers to constitute the multilayer container, by imparting oxygen absorbability to the adhesive layer therein.

DESCRIPTION OF EMBODIMENTS

The multilayer container of the present invention has a layer configuration of 3 or more layers including, as layered in that order from an inner layer to an outer layer, an oxygen-permeable layer (A) containing an oxygen-permeable resin as the main component thereof, an oxygen-absorbing adhesive layer (B) containing, as the main components thereof, an oxygen-absorbing resin composition (b1) containing a deoxidant composition (b1-i) and a thermoplastic resin (b1-ii) and an adhesive resin (b2), and a gas-barrier layer (C) containing a gas-barrier resin as the main component thereof.

The multilayer container of the present invention may contain, if needed, any other layer than the oxygen-permeable layer (A), the oxygen-absorbing adhesive layer (B) and the gas-barrier layer (C). For example, an oxygen-absorbing adhesive layer (D) containing, as the main components thereof, an oxygen-absorbing resin composition (d1) containing a deoxidant composition (d1-i) and a thermoplastic resin (d1-ii) and an adhesive resin (d2) may be layered as an outer layer of the gas-barrier layer (C), and a protective layer (E) containing a thermoplastic resin as the main component thereof may be layered as an outer layer of the oxygen-absorbing adhesive layer (D).

1. Oxygen-Permeable Layer (A)

The oxygen-permeable layer (A) plays a role of an isolation layer of preventing direct contact between the contents in the container and the oxygen-absorbing adhesive layer (B), and additionally acts for rapid and efficient permeation of oxygen inside the container therethrough in order that the oxygen-absorbing adhesive layer (B) could fully exhibit the oxygen-absorbing function thereof.

The oxygen-permeable layer (A) contains an oxygen-permeable resin as the main component thereof.

As the oxygen-permeable resin, a thermoplastic resin is preferably used. For example, there are mentioned polyolefins such as polyethylene, polypropylene, polybutene, polybutadiene, polymethylpentene, ethylene-propylene copolymer, propylene-ethylene block copolymer, etc.; polyolefin copolymers such as ethylene-vinyl acetate copolymer, ethylene-acrylic acid copolymer, ethylene-acrylate copolymer, ethylene-methacrylic acid copolymer, ethylene-methacrylate copolymer, etc.; graft polymers of the above-mentioned polyolefin or the above-mentioned polyolefin copolymer and silicone resin; polyesters such as polyethylene terephthalate, etc.; polyamides such as nylon 6, nylon 66, etc.; ionomers; elastomers, etc. One alone or two or more of these may be used either singly or as combined.

The oxygen-permeable resin is preferably a polypropylene resin from the viewpoint of heat resistance in retort treatment and hot water treatment.

The oxygen-permeable layer (A) often plays a role of a sealant layer as the innermost layer of the multilayer container. Preferably, a heat-sealable resin is selected, but an additional heat-seal layer may be provided on the inner surface side. If needed, additives such as a colorant, a filler, an antistatic agent, a stabilizer and the like may be incorporated in the resin to constitute the innermost layer.

As described above, the oxygen-permeable layer (A) is required to play a role of an isolation layer between the contents in the container and the oxygen-absorbing adhesive layer (B), and is further required to act for rapid and efficient permeation of oxygen inside the container therethrough. Consequently, irrespective of the presence or absence of any other layer such as the above-mentioned heat-seal layer or the like and irrespective of the layer thickness of the oxygen-permeable layer (A) itself, it is preferable that the oxygen permeability of the oxygen-permeable layer (A) is at least 100 mL/m$^2$·day·atm (23° C., 100% RH) or more.

The thickness of the oxygen-permeable layer (A) is preferably as thin as possible within an acceptable range in point of strength, processability, cost and the like, so as to increase the oxygen permeation through the layer. From this viewpoint, the thickness of the oxygen-permeable layer (A) is 10 to 40% of the total thickness of the multilayer container, preferably 15 to 35%, more preferably 20 to 35%. In the present invention, the thickness ratio of each layer relative to the total thickness of the multilayer container may be measured according to the method described in the section of Examples.

As obvious from the above-mentioned role thereof, the oxygen-permeable layer (A) is not always limited to a non-porous resin layer, but may be a microporous membrane of the above-mentioned thermoplastic resin or a nonwoven fabric thereof.

2. Oxygen-Absorbing Adhesive Layer (B)

The oxygen-absorbing adhesive layer (B) plays a role of absorbing oxygen that could not be completely blocked off by the gas-barrier layer (C) and may penetrate therethrough from outside the container, while acting to adhere the oxygen-permeable layer (A) and the gas-barrier layer (C) at a sufficient strength, and additionally plays a role of absorbing oxygen inside the container via the oxygen-permeable layer (A).

The oxygen-absorbing adhesive layer (B) contains, as the main components thereof, an oxygen-absorbing resin composition (b1) containing a deoxidant composition (b1-i) and a thermoplastic resin (b1-ii) and an adhesive resin (b2).

2-1. Oxygen-Absorbing Resin Composition (b1)

The oxygen-absorbing resin composition (b1) is a resin composition prepared by kneading and dispersing a deoxidant composition (b1-i) in a thermoplastic resin (b1-ii).

The deoxidant composition (b1-i) is not specifically limited, and any known deoxidant composition is usable. For example, there are mentioned deoxidant compositions containing, as the base component for oxygen absorption reaction, any of metal powder such as iron powder, etc.; reducible inorganic substances such as iron compounds, etc.; reducible organic substances such as polyphenols, polyalcohols, ascorbic acid or its salts, etc.; metal complexes, etc. Among these, a deoxidant composition containing iron powder as the main component thereof is preferred from the viewpoint of deoxidation performance, and in particular, a deoxidant composition containing iron powder and a metal halide is more preferred, and a deoxidant composition where a metal halide is adhered to iron powder is even more preferred.

Iron powder for use in the deoxidant composition (b1-i) is not specifically limited so far as it is dispersible in resin and is able to induce deoxidation reaction, and iron powder generally usable as a deoxidant may be used here. Specific examples of iron powder include reduced iron powder, spongy iron powder, sprayed iron powder, iron grinding powder, electrolytic iron powder, crushed iron, etc. Iron powder in which the content of oxygen, silicon and the like as impurities therein is smaller is preferred, and iron powder having a metal iron content of 95% by mass or more is especially preferred.

The maximum particle size of the iron powder is preferably 0.5 mm or less, more preferably 0.4 mm or less, even more preferably 0.05 to 0.35 mm or less, still more preferably 0.05 to 0.3 mm. The mean particle size of the iron powder is preferably 0.3 mm or less, more preferably 0.2 mm or less, even more preferably 0.05 to 0.2 mm, still more preferably 0.05 to 0.1 mm. From the viewpoint of the appearance of the multilayer container, iron powder having a smaller particle size is more preferable as capable of forming a smooth oxygen-absorbing layer, but from the viewpoint of cost, the particle size of the iron powder may be large in some degree within a range not having any significant influence on the appearance of the container.

The maximum particle size and the mean particle size of iron powder may be measured according to the method described in the section of Examples.

The metal halide for use in the deoxidant composition (b1-i) is one that catalyzes the oxygen absorption reaction of metal iron. Preferred examples of the metal include at least one selected from the group consisting of alkali metals, alkaline earth metals, copper, zinc, aluminium, tin, iron, cobalt and nickel. In particular, lithium, potassium, sodium, magnesium, calcium, barium and iron are preferred. Preferred examples of the halide include chlorides, bromide and iodides, and chlorides are especially preferred.

The amount of the metal halide to be incorporated is preferably 0.1 to 20 parts by mass relative to 100 parts by mass of metal. It is preferable that substantially all of the metal of the metal halide adheres to metal iron and there are few metal halides that are free in the deoxidant composition, and when the metal halide acts effectively, its amount of 0.1 to 5 parts by mass may be enough.

In the present invention, an iron powder composition in which the surface is coated with a metal halide can be favorably used as the deoxidant composition (b1-i). The iron powder composition may be prepared by mixing an aqueous solution of a metal halide in iron powder, and then drying the resultant mixture for water removal.

Preferably, the metal halide is added according to a method where it does not easily separate from metal iron, and for example, a method of burying metal halide microparticles in the recesses of the surface of metal iron by grinding and mixing them using a ball mill, a speed mill or the like; a method of adhering metal halide microparticles to the surface of metal iron using a binder; and a method of mixing an aqueous solution of a metal halide and metal iron and drying the resultant mixture so as to adhere metal halide microparticles to the surface of metal iron are preferred.

Preferably, the water content in the deoxidant composition is small, and the water content in the deoxidant composition (b1-i) is preferably 0.2% by mass or less, more preferably 0.1% by mass or less. In the case where the multilayer container of the present invention is used as a packaging material, the deoxidant composition receives moisture and exhibits an oxygen absorption function. The deoxidant composition in which the base component is iron powder is used as a granular matter, and the mean particle size thereof is preferably 0.3 mm or less, more preferably 0.2 mm or less, even more preferably 0.05 to 0.2 mm.

The thermoplastic resin (b1-ii) for use in the oxygen-absorbing resin composition (b1) is preferably a thermoplastic resin whose Vicat softening point is 110 to 130° C. By using a thermoplastic resin whose softening point falls within the above range, it may be possible to prevent any local overheating around the deoxidant composition (b1-i) in the oxygen-absorbing resin composition (b1) in thermoforming to give a deoxidant multilayer body, and therefore it may be possible to form a container having a good appearance.

Specific examples of the thermoplastic resin (b1-ii) for use in the oxygen-absorbing resin composition (b1) include polyolefins such as polyethylene, polypropylene, polybutadiene, polymethylpentene, etc.; elastomers and their modified derivatives, and mixed resins thereof. Above all, resins containing polypropylene as the main component thereof are preferably used. The thermoplastic resin (b1-ii) for use in the oxygen-absorbing resin composition (b1) may receive thermal history once or more in an extruder at a temperature not lower than the melting point of the resin, that is, a so-called recycled resin may be used. The recycled resin may be a single substance or a mixture that contains the above-mentioned thermoplastic resin as the main component thereof. For example, those prepared by grinding the waste in forming the deoxidant multilayer body or multilayer container of the present invention, or those prepared by again melting the ground waste, extruding it to give strands and pelletizing them, or mixtures thereof may be used as the recycled resin.

In the present invention, the thermoplastic resin (b1-ii) for use in the oxygen-absorbing resin composition (b1) is not an adhesive resin.

The ratio by mass of the deoxidant composition (b1-i) to the thermoplastic resin (b1-ii) ((b1-i)/(b1-ii)) in the oxygen-absorbing resin composition (b1) may be suitably defined depending on the blending ration of the oxygen-absorbing resin composition (b1) and the adhesive resin (b2), and is preferably 10/90 to 90/10, more preferably 20/80 to 80/20. Falling within the range, the composition can exhibit good deoxidation performance without having any negative influence on the molding processability and appearance of container.

From the viewpoint of preventing foaming and evading loss of effects in an unattended situation, it is preferable that calcium oxide is added to the oxygen-absorbing resin composition (b1). If needed, additives of an antioxidant such as a phenolic antioxidant, a phosphorus-based antioxidant or the like; a colorant such as an organic or an inorganic dye or pigment or the like; a dispersant such as a silane-based dispersant, a titanate-based dispersant or the like; a polyacrylic acid-based water absorbent; a filler such as silica, clay or the like; and a gas adsorbent such as zeolite, activated carbon or the like may also be added.

The oxygen-absorbing resin composition (b1) may be prepared by kneading the deoxidant composition (b1-i) and the thermoplastic resin (b1-ii), then optionally kneading an additive such as calcium oxide or the like therein, and thus uniformly dispersing the deoxidant composition (b1-i) in the thermoplastic resin (b1-ii). In the case where an additive is added, it is preferable from the viewpoint of uniformly dispersing the additive, that the additive is first kneaded in a thermoplastic resin to prepare an additive-containing resin composition and then, a deoxidant composition, a thermoplastic resin and the additive-containing resin composition are kneaded to prepare the oxygen-absorbing resin composition.

2-2. Adhesive Resin (b2)

The adhesive resin (b2) is not specifically limited, and any known adhesive thermoplastic resin may be used. For example, there are mentioned acid-modified polyolefins prepared by modifying an olefinic resin with an unsaturated carboxylic acid such as acrylic acid, methacrylic acid, maleic acid, maleic anhydride, etc. One alone or two or more of these may be used either singly or as combined.

From the viewpoint of the compatibility between the oxygen-absorbing resin composition (b1) and the adhesive resin (b2), the adhesive resin (b2) is preferably one prepared by modifying the same resin as the thermoplastic resin (b1-ii) used in the oxygen-absorbing resin composition (b1) with an unsaturated carboxylic acid. For example, in the case where the thermoplastic resin (b1-ii) for use in the oxygen-absorbing resin composition (b1) is a resin containing polypropylene as the main component thereof, it is preferable that the adhesive resin (b2) is an acid-modified thermoplastic resin containing polypropylene as the main component thereof.

From the viewpoint of the adhesiveness to the oxygen-permeable resin (A), the adhesive resin is preferably one prepared by modifying the same resin as that constituting the oxygen-permeable resin (A) with an unsaturated carboxylic acid. In the case where the oxygen-permeable resin to form the oxygen-permeable layer (A) is polyolefin, the adhesive resin (b2) is preferably one prepared by acid-modifying the same resin as the polyolefin to constitute the oxygen-permeable layer (A).

The ratio by mass of the oxygen-absorbing resin composition (b1) to the adhesive resin (b2) (b1/b2) in the oxygen-absorbing adhesive layer (B) may be suitably defined depending on the blending ratio of the deoxidant composition (b1-i) and the resin (b1-ii) in the oxygen-absorbing resin composition (b1), and is, from the viewpoint of the balance between oxygen absorbability and adhesiveness, preferably 40/60 to 70/30, more preferably 45/55 to 70/30, even more preferably 50/50 to 70/30.

As described above, the oxygen-absorbing adhesive layer (B) contains, as the main components thereof, the oxygen-absorbing resin composition (b1) and the adhesive resin (b2). Accordingly, the oxygen-absorbing adhesive layer (B) is composed of at least the deoxidant composition (b1-i), the thermoplastic resin (b1-ii) and the adhesive resin (b2).

The content of the deoxidant composition (b1-i) in the oxygen-absorbing adhesive layer (B) is, from the viewpoint of securing a balance between oxygen absorbability and adhesiveness and realizing excellent oxygen absorbability, preferably 5 to 50% by mass relative to 100% by mass of the material to constitute the oxygen-absorbing adhesive layer (B), more preferably 15 to 45% by mass, even more preferably 25 to 40% by mass.

The content of the adhesive resin (b2) in the oxygen-absorbing adhesive layer (B) is, from the viewpoint of securing a balance between oxygen absorbability and adhesiveness and realizing excellent adhesiveness, preferably 20 to 70% by mass relative to 100% by mass of the material constituting the oxygen-absorbing adhesive layer (B), preferably 25 to 65% by mass, more preferably 30 to 60% by mass. When the adhesive resin (b2) is too much, the content of the deoxidant composition (b1-i) in the oxygen-absorbing adhesive layer (B) may decrease so that the oxygen-absorbing rate may be slow. In addition, in general, the adhesive resin (b2) is expensive, and from an economical perspective, the amount thereof to be used is preferably smaller.

The material to constitute the oxygen-absorbing adhesive layer (B) may be prepared by kneading the oxygen-absorbing resin composition (b1) and the adhesive resin (b2). Within a range not detracting from the advantageous effects of the present invention, any additive may be further kneaded in them, if needed.

The thickness of the oxygen-absorbing adhesive layer (B) is 10 to 30% of the total thickness of the multilayer container, preferably 15 to 30%, more preferably 15 to 25%. Falling within the range, the layer can have good adhesiveness and can exhibit good deoxidant performance without having any negative influence on the molding processability and the appearance of containers. In general, the adhesive resin (b2) is expensive, and from an economical perspective, the oxygen-absorbing adhesive layer (B) is preferably thinner so that the amount of the adhesive resin (b2) to be used could be smaller.

3. Gas-Barrier Layer (C)

The gas-barrier layer (C) plays a role of blocking oxygen from penetrating from outside the container therethrough.

The gas-barrier layer (C) contains a gas-barrier resin as the main component thereof, and the gas-barrier resin is a polyamide resin (X) including a diamine unit containing a metaxylylenediamine unit in an amount of 70 mol % or more and a dicarboxylic acid unit containing 75 to 96 mol % of an α,ω-linear aliphatic dicarboxylic acid unit having 4 to 20 carbon atoms and 25 to 4 mol % of an aromatic dicarboxylic acid unit.

The diamine unit in the polyamide resin (X) contains, from the viewpoint of expressing excellent gas-barrier performance, a metaxylylenediamine unit in an amount of 70 mol % or more, preferably in an amount of 80 to 100 mol %, more preferably 90 to 100 mol %.

Examples of the compound capable of constituting the other diamine unit than the metaxylylenediamine unit include aromatic diamines such as paraxylylenediamine, etc.; alicyclic diamines such as 1,3-bis(aminomethyl)cyclohexane, 1,4-bis(aminomethyl)cyclohexane, etc.; linear or branched aliphatic diamines such as tetramethylenediamine, hexamethylenediamine, nonamethylenediamine, 2-methyl-1,5-pentanediamine, etc. However, the compound is not limited to these.

The dicarboxylic acid unit in the polyamide resin (X) contains 75 to 96 mol % of an $\alpha,\omega$-linear aliphatic dicarboxylic acid unit having 4 to 20 carbon atoms and 25 to 4 mol % of an aromatic dicarboxylic acid unit. In the dicarboxylic acid unit in the polyamide resin (X), the content of the $\alpha,\omega$-linear aliphatic dicarboxylic acid unit having 4 to 20 carbon atoms is preferably 88 to 96 mol %, more preferably 90 to 94 mol %, and the content of the aromatic dicarboxylic acid unit therein is preferably 12 to 4 mol %, more preferably 10 to 6 mol %.

The content of the $\alpha,\omega$-linear aliphatic dicarboxylic acid unit having 4 to 20 carbon atoms in the dicarboxylic acid unit is 75 mol % or more, and therefore the resin can prevent reduction in the gas-barrier performance and excessive reduction in the crystallinity thereof. Containing an aromatic dicarboxylic acid unit in an amount of 4 mol % or more, the amorphousness of the polyamide resin (X) increases and the crystallization rate thereof lowers, and therefore the thermoformability in molding into containers may be thereby bettered.

When the content of the aromatic dicarboxylic acid unit is more than 25 mol %, the polymerization to give the polyamide resin (X) could not be on the level of the melt viscosity necessary for forming multilayer containers and therefore, multilayer containers would be difficult to form. Further, since the polyamide resin (X) could not almost be crystalline, the multilayer container using the polyamide resin (X) as the gas-barrier layer is unfavorable in that it would be greatly whitened in thermal sterilization such as a boiling sterilization treatment by immersion in hot water at 80 to 100° C. or a pressurized hot water treatment at 100° C. or more (retort treatment) or the like, or during high-temperature storage.

Examples of the compound capable of constituting the $\alpha,\omega$-linear aliphatic dicarboxylic acid unit having 4 to 20 carbon atoms include succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, etc., but the compound is not limited to these. One alone or two or more of these may be used either singly or as combined. Among these, adipic acid is preferred.

Examples of the compound capable of constituting the aromatic dicarboxylic acid unit include terephthalic acid, isophthalic acid, 2,6-naphthalenedicarboxylic acid, etc., but the compound is not limited to these. One alone or two or more of these may be used either singly or as combined. Among these, isophthalic acid is preferred from the viewpoint of sublimability and availability.

In the present invention, the polyamide resin (X) is crystalline, and the semi-crystallization time (ST(P)) thereof in crystallization at 160° C. in depolarization photometry is preferably within a range of 80 to 700 seconds, more preferably 80 to 650 seconds, even more preferably 85 to 300 seconds, still more preferably 90 to 200 seconds. By controlling the semi-crystallization time to be 80 seconds or more, molding failure owing to crystallization during secondary processing such as deep drawing of multilayer containers may be evaded. When the semi-crystallization time is 700 seconds or less, crystallinity may be prevented from excessively lowering while maintaining secondary processability, and further, multilayer containers may be prevented from being deformed owing to softening of the polyamide layer during hot water treatment or retort treatment.

The oxygen transmission coefficient of the polyamide resin (X) in an environment at 23° C. and 60% RH is, from the viewpoint of good gas barrier performance, preferably 0.09 mL·mm/m$^2$·day·atm or less, more preferably 0.05 to 0.09 mL·mm/m$^2$·day·atm, even more preferably 0.05 to 0.070 mL·mm/m$^2$·day·atm. The oxygen transmission coefficient may be measured according to ASTM D3985, and for example, may be measured using "OX-TRAN 2/21" manufactured by Mocon Inc.

The polyamide resin (X) may be obtained through polycondensation of a diamine component containing metaxylylenediamine in an amount of 70 mol % or more and a dicarboxylic acid component containing 75 to 96 mol % of an $\alpha,\omega$-linear aliphatic dicarboxylic acid having 4 to 20 carbon atoms and 25 to 4 mol % of an aromatic dicarboxylic acid. During polycondensation, a small amount of a monoamine or a monocarboxylic acid may be added as a molecular weight-controlling agent.

Preferably, the polyamide resin (X) is one produced through polycondensation according to a melt polymerization method followed by solid-phase polymerization. As a melt polycondensation method, for example, there is mentioned a method of polymerizing a nylon salt composed of a diamine component and a dicarboxylic acid component by heating it in a molten state under pressure and in the presence of water while removing the added water and the condensation water. In addition, there is also mentioned a method of polycondensation including directly adding a diamine component to a dicarboxylic acid component in a molten state. In this case, the polycondensation is carried out in such a manner that, for keeping the reaction system in a uniform liquid condition, the diamine component is continuously added to the dicarboxylic acid component and during this, the reaction system is heated so that the reaction temperature could not be lower than the melting point of the formed oligoamide and polyamide resin.

Preferably, the solid-phase polymerization is carried out after the polymer obtained in melt polycondensation has been once taken out. As a heating device to be used in solid-phase polymerization, a batch-type heating device excellent in airtightness and capable of highly preventing contact between oxygen and polyamide resin is preferred to a continuous heating device, and in particular, a rotary drum-type heating device called a tumble dryer, a conical dryer, or a rotary dryer, and a cone-shaped heating device equipped with a rotary blade inside it, called a Nauta mixer, may be favorably used. However, the heating device is not limited to these.

The solid-phase polymerization process for the polyamide resin preferably includes, for example, for the purpose of preventing the polyamide resin pellets from fusing together and preventing the polyamide resin pellets from adhering to the inner wall of devices, a first step for increasing the crystallinity degree of the polyamide resin, a second step of increasing the molecular weight of the polyamide resin and a third step of cooling the polyamide resin after the solid-phase polymerization has been promoted to give a desired molecular weight of the resin. Preferably, the first step is carried out at a temperature not higher than the glass transition temperature of the polyamide resin. Preferably, the second step is carried out at a temperature lower than the melting point of the polyamide resin under reduced pressure, but is not limited thereto.

The polyamide resin (X) may contain any optional additives such as a lubricant, a delusterant, a heat-resistant stabilizer, a weather-resistant stabilizer, a UV absorbent, a crystallization nucleating agent, a plasticizer, a flame retardant, an antistatic agent, a coloration inhibitor, a gelling inhibitor, etc., within a range not detracting from the advantageous effects of the present invention.

The thickness of the gas-barrier layer (C) is not specifically limited, but is, from the viewpoint of gas-barrier performance, transparency and cost, preferably 2 to 20% of the total thickness of the multilayer container, more preferably 5 to 15%, even more preferably 5 to 10%.

4. Oxygen-Absorbing Adhesive Layer (D)

The oxygen-absorbing adhesive layer (D) that may be layered as an outer layer of the gas-barrier layer (C) plays a role of adhering the gas-barrier layer (C) and the protective layer (E) at a sufficient strength and plays a role of absorbing oxygen penetrating therethrough from outside the container, further playing a role of protecting the gas-barrier layer (C).

The oxygen-absorbing adhesive layer (D) contains, as the main components thereof, an oxygen-absorbing resin composition (d1) containing a deoxidant composition (d1-i) and a thermoplastic resin (d1-ii) and an adhesive resin (d2).

As the oxygen-absorbing resin composition (d1), the above-mentioned oxygen-absorbing resin composition may be used, and the composition may be the same as or different from the oxygen-absorbing resin composition (b1) for use in the oxygen-absorbing adhesive layer (B). As the adhesive resin (d2), the above-mentioned adhesive thermoplastic resin may be used, and the resin may be the same as or different from the adhesive resin (b2) for use in the oxygen-absorbing adhesive layer (B).

In the present invention, the thermoplastic resin (d1-ii) for use in the oxygen-absorbing resin composition (d1) is not an adhesive resin.

The ratio by mass of the oxygen-absorbing resin composition (d1) to the adhesive resin (d2) (d1/d2) in the oxygen-absorbing adhesive layer (D) may be suitably defined depending on the blending ratio of the deoxidant composition (d1-i) and the thermoplastic resin (d1-ii) in the oxygen-absorbing resin composition (d1), and is, from the viewpoint of the balance between oxygen absorbability and adhesiveness, preferably 40/60 to 70/30, more preferably 45/55 to 70/30, even more preferably 50/50 to 70/30.

The content of the deoxidant composition (d1-i) in the oxygen-absorbing adhesive layer (D) is, from the viewpoint of securing a balance between oxygen absorbability and adhesiveness and realizing excellent oxygen absorbability, preferably 5 to 50% by mass relative to 100% by mass of the material to constitute the oxygen-absorbing adhesive layer (D), more preferably 15 to 45% by mass, even more preferably 25 to 40% by mass.

The content of the adhesive resin (d2) in the oxygen-absorbing adhesive layer (D) is, from the viewpoint of securing a balance between oxygen absorbability and adhesiveness and realizing excellent adhesiveness, preferably 20 to 70% by mass relative to 100% by mass of the material constituting the oxygen-absorbing adhesive layer (D), preferably 25 to 65% by mass, more preferably 30 to 60% by mass. When the adhesive resin (d2) is too much, the content of the deoxidant composition (d1-i) in the oxygen-absorbing adhesive layer (D) may decrease so that the oxygen-absorbing rate may be slow. In addition, in general, the adhesive resin (d2) is expensive, and from an economical perspective, the amount thereof to be used is preferably smaller.

The thickness of the oxygen-absorbing adhesive layer (D) is 10 to 30% of the total thickness of the multilayer container, preferably 15 to 30%, more preferably 15 to 25%. Falling within the range, the layer can exhibit good deoxidant performance without having any negative influence on the molding processability and the appearance of containers. In general, the adhesive resin (d2) is expensive, and from an economical perspective, the oxygen-absorbing adhesive layer (D) is preferably thinner so that the amount of the adhesive resin (d2) to be used could be smaller.

5. Protective Layer (E)

The protective layer (E) that may be layered as the outer layer of the oxygen-absorbing adhesive layer (D) plays a role of protecting the gas-barrier layer (C) and the oxygen-absorbing adhesive layer (D).

The protective layer (E) preferably contains a thermoplastic resin as the main component thereof. For example, there are mentioned polyolefins such as polyethylene, polypropylene, polybutene, polybutadiene, polymethylpentene, ethylene-propylene copolymer, propylene-ethylene block copolymer, etc.; polyolefin copolymers such as ethylene-vinyl acetate copolymer, ethylene-acrylic acid copolymer, ethylene-acrylate copolymer, ethylene-methacrylic acid copolymer, ethylene-methacrylate copolymer, etc.; graft polymers of the above-mentioned polyolefins or the above-mentioned polyolefin copolymers with silicone resin; polyesters such as polyethylene terephthalate, etc.; polyamides such as nylon 6, nylon 66, etc.; ionomers; elastomers, etc. One alone or two or more of these may be used either singly or as combined. Above all, at least one selected from the group consisting of polypropylene resin, polyamide resin and polyester resin is preferred, and polypropylene resin is more preferred.

The thickness of the protective layer (E) is not specifically limited and may vary depending on the layer configuration of the multilayer container. For example, the thickness is preferably 15 to 60% of the total thickness of the multilayer container, more preferably 20 to 40%, even more preferably 20 to 30%.

The total thickness of the multilayer container is, from the viewpoint of toughness, rigidity and barrier performance as containers, preferably 0.2 to 2.0 mm, more preferably 0.5 to 1.8 mm, even more preferably 0.8 to 1.5 mm.

The above-mentioned layers may be layered by suitably combining known methods of a co-extrusion method, various lamination methods and various coating methods, depending on the property of the material of each layer, the working object and the working process. For example, using extruders corresponding to the constitutive layers of an oxygen-permeable layer (A), an oxygen-absorbing adhesive layer (B) and a gas-barrier layer (C), the materials to constitute the individual layers are melt-kneaded, and simultaneously melt-extruded through a multilayer multi-die such as a T-die, a circular die or the like, thereby giving a multilayer sheet having a three-layer or more multilayer configuration of, as layered from an inner layer to an outer layer in that order, the oxygen-permeable layer (A), the oxygen-absorbing adhesive layer (B) and the gas-barrier layer (C), as a deoxidant multilayer body.

The resultant deoxidant multilayer body is thermoformed with the inner layer side kept facing inside, thereby giving a multilayer container having a predetermined shape. Vacuum forming, pressure forming, plug-assisted forming or the like is applicable to the forming method. On the other hand, using extruders corresponding to the constitutive layers of an oxygen-permeable layer (A), an oxygen-absorbing adhesive layer (B) and a gas-barrier layer (C), the materials to constitute the individual layers may be melt-kneaded, then the resulting hollow parison may be melt-extruded through a circular die, and blow-molded in a mold to give a deoxidant multilayer container. The molding temperature in this case may be selected within a range of 160° C. to 175° C., when a polyamide (X) having a specific composition is used as the gas-barrier resin, and the forming operation may be attained within a relatively low temperature range. Heating for container formation may be carried out in a mode of contact heating or noncontact heating. By contact heating, the temperature profile to generate in the deoxidant multilayer body may be reduced as much as possible, and therefore outward failure of containers such as uneven stretching of each layer may be reduced.

The multilayer container of the present invention is excellent in oxygen barrier performance and oxygen absorbing capability, and is also excellent in flavor retaining performance for contents thereof, and thus the container is suitable for packaging various articles.

Examples of the articles to be stored in the multilayer container of the present invention include various articles, for example, beverages, such as milk, milk products, juice, coffee, tea beverages and alcohol beverages; liquid seasonings, such as Worcester sauce, soy sauce and dressing; cooked foods, such as soup, stew, curry, infant cooked foods and nursing care cooked foods; paste foods, such as jam, mayonnaise, ketchup and jelly; processed seafood, such as tuna and other seafood; processed milk products, such as cheese and butter; processed meat products, such as dressed meat, salami, sausage and ham; vegetables, such as carrot and potato; egg; noodles; processed rice products, such as uncooked rice, cooked rice and rice porridge; dry foods, such as powder seasonings, powder coffee, infant powder milk, powder diet foods, dried vegetables and rice crackers; chemicals, such as agrichemicals and insecticides; medical drugs; cosmetics; pet foods; and sundry articles, such as shampoo, conditioner and cleanser. Among these, the container is favorably used for articles to be subjected to a heat sterilization treatment, such as a boiling treatment and a retort treatment, for example, jelly containing fruit pulp, fruit juice, coffee or the like, yokan (sweet bean jelly), cooked rice, processed rice, prepared foods for infants, prepared foods for nursing care, curry, soup, stew, jam, mayonnaise, ketchup, pet foods, processed seafood and the like.

Furthermore, before or after charging the article to be stored, the packaging container formed of the multilayer formed body and/or of the article to be stored may be subjected to sterilization in the form suitable for the article to be stored. Examples of the sterilization method include heat sterilization, such as a hydrothermal treatment (boiling treatment) at 100° C. or lower, a pressurized hydrothermal treatment (retort treatment) at 100° C. or higher, and an ultrahigh temperature heat treatment at 130° C. or higher; electromagnetic wave sterilization with ultraviolet rays, microwaves or gamma waves; gas treatment, with ethylene oxide gas or the like; and chemical sterilization with hydrogen peroxide, hypochlorous acid or the like.

EXAMPLES

The present invention will be described in more detail with reference to the following Examples, but the present invention is not limited to these Examples.

Production Example 1

(Production of Polyamide Resin X1)

15,000 g (102.6 mol) of adipic acid (AdA) (manufactured by Asahi Kasei Corp.) and 1,088 g (6.6 mol) of isophthalic acid (IPA) (manufactured by AG International Chemical Company, Inc.) were put into a jacketed 50-L reactor equipped with a stirrer, a partial condenser, a cooler, a thermometer, a dropping tank and a nitrogen gas inlet tube, and sodium hypophosphite monohydrate was put thereinto so that the phosphorus concentration could be 300 ppm relative to the polymer yield and sodium acetate was put thereinto so that the sodium concentration could be 401 ppm relative to the polymer yield. The polymerization device was fully purged with nitrogen, and then heated up to 170° C. in a nitrogen stream atmosphere to make the dicarboxylic acid fluidized, and 14,783.8 g (108.5 mol) of metaxylylenediamine (MXDA) (manufactured by Mitsubishi Gas Chemical Company, Inc.) was dropwise added thereto with stirring. During this, the inner temperature was continuously raised up to 245° C., and water distilled along with the dropwise addition of metaxylylenediamine was removed out of the system via the partial condenser and the cooler. After the dropwise addition of metaxylylenediamine, the inner temperature was continuously raised up to 255° C. and the reaction was continued for 15 minutes. Subsequently, the inner pressure in the reaction system was continuously reduced down to 600 mmHg over 10 minutes, and then the reaction was continued for 40 minutes. During this, the reaction temperature was continuously raised up to 260° C. After the reaction, the reactor was pressurized up to 0.2 MPa with nitrogen gas so that the polymer was taken out as strands through the nozzle at the bottom of the polymerization reactor, then cooled with water and cut into pellets of a polyamide resin X1.

Production Example 2

(Production of Polyamide Resin X2)

The pellets of the polyamide resin X1 obtained in Production Example 1 were dry-blended with 400 ppm of a lubricant, calcium stearate (manufactured by NOF Corporation) added thereto, using a tumbler, thereby giving pellets of a polyamide resin X2.

Production Example 3

(Production of Polyamide Resin X3)

Pellets of a polyamide resin X3 were produced in the same manner as in Production Example 1, except that the molar ratio relative to 100 mol % of the total of the dicarboxylic acid component was changed to 90 mol % of adipic acid and 10 mol % of isophthalic acid.

The relative viscosity, the terminal group concentration, the glass transition temperature, the melting point and the semi-crystallization time of the polyamide resins obtained in Production Examples 1 to 3 were measured according to the methods mentioned below. The polyamide resins obtained in Production Examples 1 to 3 were individually formed into an unstretched film having a thickness of 50 μm, and the oxygen penetration coefficient thereof was measured according to the method mentioned below. The results are shown in Table 1.

(1) Relative Viscosity 0.2 g of a pellet sample was precisely weighed and dissolved in 20 mL of 96% sulfuric acid at 20 to 30° C. under stirring. After completely dissolved, 5 mL of the solution was quickly placed in a Cannon-Fenske viscometer, which was then allowed to stand in a thermostat chamber at 25° C. for 10 minutes, and then the fall time (t) was measured. The fall time (to) of 96% sulfuric acid itself was measured in the same manner. The relative viscosity was calculated from t and to according to the following expression.

Relative viscosity=$t/t_0$ (2) Terminal Group Concentration in Polyamide Resin (a) Terminal Amino Group Concentration ([NH$_2$] mmol/kg)

0.5 g of the polyamide resin was precisely weighed and dissolved in 30 mL of a solution of phenol/ethanol=4/1 by volume under stirring. After the polyamide was completely dissolved, the solution was subjected to neutralization titration with N/100 hydrochloric acid, thereby measuring the terminal amino group concentration.

(b) Terminal Carboxyl Group Concentration ([COOH] mmol/kg)

0.5 g of the polyamide resin was precisely weighed and dissolved in 30 mL of benzyl alcohol in a nitrogen stream atmosphere at 160 to 180° C. After the polyamide was completely dissolved, the solution was cooled down to 80° C. in a nitrogen stream atmosphere and, with stirring, 10 mL of methanol was added and subjected to neutralization titration with an aqueous N/100 sodium hydroxide solution, thereby measuring the terminal carboxyl group concentration.

(3) Glass Transition Temperature and Melting Point

DSC measurement (differential scanning calorimeter measurement) was performed with a differential scanning calorimeter ("DSC-60", manufactured by Shimadzu Corporation) at a heating rate of 10° C./min in a nitrogen stream atmosphere, thereby measuring the glass transition temperature (Tg) and the melting point (Tm).

(4) Semi-Crystallization Time

First, an unstretched film formed of the polyamide resin having a thickness of 100 μm was prepared. As a device, a semi-crystallization time analyzer (Model: MK701, manufactured by Kotaki Seisakusho Co., Ltd.) was used. Next, five sheets of the polyamide resin film having a thickness of 100 μm were laid one on top of another, then melted in a hot air atmosphere at 260° C. for 3 minutes, thereafter immersed in an oil bath at 160° C., and the light transmittance change up to the end of crystallization was measured. A half of the time for the light transmittance change until the end of crystallization (semi-crystallization time) was measured according to a depolarization light intensity method.

(5) Oxygen Transmission Coefficient of Unstretched Film

The oxygen transmission coefficient of the unstretched film formed of the polyamide resin was measured according to ASTM D3985. Concretely, as a sample, an unstretched film formed of the polyamide resin having a thickness of 50 μm was prepared. Using an oxygen transmittance rate measuring device ("OX-TRAN 2/61" manufactured by Mocon Inc.), the oxygen transmission rate of the unstretched film in an environment at 23° C. and 60% RH was measured.

(6) Measurement of Mean Particle Size and Maximum Particle Size of Iron Powder

Using a laser diffraction scattering type particle sizer "SK Laser Micron Sizer LMS-2000e" (manufactured by Seishin Enterprise Co., Ltd.), the mean particle size and the maximum particle size of iron powder were measured.

TABLE 1

| | | | Polyamide No | | |
|---|---|---|---|---|---|
| | | | X1 | X2 | X3 |
| Additive | calcium stearate (lubricant) | ppm | 0 | 400 | 0 |
| Monomer Composition | metaxylylenediamine (MXDA) | mol % *1 | 100 | 100 | 100 |
| | adipic acid (AdA) | mol % *2 | 94 | 94 | 90 |
| | high-purity isophthalic acid (IPA) | mol % *3 | 6 | 6 | 10 |
| Properties | Relative Viscosity | | 2.7 | 2.7 | 2.7 |
| | Terminal Group Concentration [NH$_2$] | mmol/kg | 19 | 19 | 20 |
| | [COOH] | mmol/kg | 63 | 63 | 63 |
| | Thermal Properties glass transition temperature Tg | ° C. | 92 | 92 | 94 |
| | melting point Tm | ° C. | 229 | 229 | 221 |
| | Semi-crystallization time | sec | 92 | 92 | 198 |
| | Oxygen Transmission Coefficient of Unstretched Film 23° C. 60% RH | cc · mm/ m$^2$ · day · atm | 0.072 | 0.072 | 0.070 |

*1: Ratio in diamine unit 100 mol %
*2, *3: Ratio in dicarboxylic acid unit 100 mol %

Example 1

Iron powder (mean particle size: 0.1 mm, maximum particle size: 0.3 mm) was put into a vacuum mixing drier equipped with a heating jacket, and while heated and dried at 130° C. under a reduced pressure of 10 mmHg, 2 parts by mass of a mixed aqueous solution of calcium chloride/water=1/1 (ratio by mass) relative to 100 parts by mass of the iron powder was sprayed thereover to prepare a deoxidant composition (b1-i) of iron powder coated with calcium chloride.

Next, using a 32 mmφ unidirectionally-rotating twin-screw extruder, calcium oxide (mean particle size: 10 μm, maximum particle size: 50 μm) and homopolypropylene ("Novatec PP FY6" manufactured by Japan Polypropylene Corporation) were kneaded in 50/50 (ratio by mass), extruded out as strands, cooled with a blower-equipped net belt, and cut with a strand cutter into pellets of a calcium oxide-added resin composition.

Similarly, using a 32 mmφ unidirectionally-rotating twin-screw extruder, a phenolic antioxidant ("Irganox 1330" manufactured by BASF, chemical name: 1,3,5-trimethyl-2,4,6-tris(3,5-di-t-butyl-4-hydroxybenzyl)benzene), a phosphorus antioxidant ("Irgafos 168" manufactured by BASF, chemical name: tris(2,4-di-t-butylphenyl) phosphite) and homopolypropylene ("Novatec PP FY6" manufactured by Japan Polypropylene Corporation) were kneaded in 0.1/0.1/99.8 (ratio by mass), extruded out as strands, cooled with a blower-equipped net belt, and cut with a strand cutter into pellets of an antioxidant-added resin composition.

Subsequently, using a 32 mmφ unidirectionally-rotating twin-screw extruder, the above-mentioned deoxidant composition (b1-i), homopolypropylene ("Novatec PP FY6" manufactured by Nippon Polypropylene Corporation), the calcium oxide-added resin composition pellets and the antioxidant-added resin composition pellets were kneaded in 60/36/3/1 (ratio by mass), extruded out as strands, cooled with a blower-equipped net belt, and cut with a strand cutter into pellets of an oxygen-absorbing resin composition (b1). Here, the ratio by mass of the deoxidant composition (b1-i) to the thermoplastic resin (b1-ii), (b1-i)/(b1-ii) in the oxygen-absorbing resin composition (b1) is 60/40.

Next, using a multilayer sheet molding apparatus including 1st to 3rd, 40 mmφ extruders, a feed block, a T-die, a cooling roll and a sheet take-up unit, the polyamide X1 obtained in Production Example 1 was extruded out through the first extruder, a dry blend of the pellets of the oxygen-absorbing resin composition (b1) and the pellets of the adhesive resin (b2) in 50/50 (ratio by mass) was through the second extruder, and a dry blend of homopolypropylene ("Novatec PP FY6" manufactured by Japan Polypropylene Corporation) and titanium oxide 60%-containing polypropylene-base white master batch (manufactured by Tokyo Ink Co., Ltd.) in 90/10 (ratio by mass) was through the third extruder to prepare a multilayer sheet (deoxidant multilayer body) (total thickness 1 mm). As the adhesive layer (b2), maleic anhydride-modified polypropylene ("Modic P604V" manufactured by Mitsubishi Chemical Corporation) was used. The layer configuration of the multilayer sheet is composed of oxygen-permeable layer (A) (PP, inner layer)/oxygen-absorbing adhesive layer (B)/gas-barrier layer (C)/oxygen-absorbing adhesive layer (D)/protective layer (E) (PP, outer layer). The resultant sheet was thermoformed with the inner layer side thereof kept facing inward to produce a 3-kind 5-layer multilayer container shown in Table 2.

The total thickness and the ratio of each layer of the multilayer container were measured by cutting the multilayer container with a cutter, and analyzing the cross section with an optical microscope. Concretely, two points in the center of the side and two pints in the center of the bottom of the multilayer container, totaling 4 points, were analyzed for the container thickness (total thickness) and the thickness of each layer at each point. At every point, the thickness ratio of each layer to the total thickness was obtained, and the mean value was calculated. Each thickness ratio at the four points measured fell within a range of ±3% of the mean value. In particular, in the multilayer container of the present invention, the ratio of each layer satisfied the predetermined numerical range at every measurement point.

Example 2

A 3-kind 5-layer multilayer container shown in Table 2 was produced in the same manner as in Example 1, except that the polyamide resin X1 was changed to the polyamide resin X2.

Example 3

A 3-kind 5-layer multilayer container shown in Table 2 was produced in the same manner as in Example 1, except that the polyamide resin X1 was changed to the polyamide resin X3.

Example 4

A 3-kind 5-layer multilayer container shown in Table 2 was produced in the same manner as in Example 2, except that the thickness ratio of each layer relative to the total thickness of the multilayer container was changed as shown in Table 2 so that the thickness ratio of the gas-barrier layer (C) relative to the total thickness of the multilayer container could be 10%.

Example 5

A 3-kind 5-layer multilayer container shown in Table 2 was produced in the same manner as in Example 2, except that the thickness ratio of each layer relative to the total thickness of the multilayer container was changed as shown in Table 2 so that the thickness ratio of the gas-barrier layer (C) relative to the total thickness of the multilayer container could be 15%.

Example 6

A 3-kind 5-layer multilayer container shown in Table 2 was produced in the same manner as in Example 2, except that the thickness ratio of each layer relative to the total thickness of the multilayer container was changed as shown in Table 2 so that the thickness ratio of the oxygen-permeable layer (A) and the oxygen-absorbing adhesive layer (B) relative to the total thickness of the multilayer container could be 37% and 10%, respectively.

Example 7

A 3-kind 5-layer multilayer container shown in Table 2 was produced in the same manner as in Example 2, except that the thickness ratio of each layer relative to the total thickness of the multilayer container was changed as shown in Table 2 so that the thickness ratio of the oxygen-permeable layer (A) and the oxygen-absorbing adhesive layer (B) relative to the total thickness of the multilayer container could be 17% and 30%, respectively.

Example 8

A 3-kind 5-layer multilayer container shown in Table 2 was produced in the same manner as in Example 2, except that the ratio by mass of the deoxidant composition (b1-i) to the thermoplastic resin (b1-ii) in the oxygen-absorbing resin composition (b1), (b1-i)/(b1-ii) was changed to 20/80 and that the thickness ratio of each layer relative to the total thickness of the multilayer container was changed as shown in Table 2 so that the thickness ratio of the oxygen-permeable layer (A) relative to the total thickness of the multilayer container could be 32%.

Example 9

A 3-kind 5-layer multilayer container shown in Table 2 was produced in the same manner as in Example 8, except that the ratio by mass of the deoxidant composition (b1-i) to the thermoplastic resin (b1-ii) in the oxygen-absorbing resin composition (b1), (b1-i)/(b1-ii) was changed to 40/60.

Example 10

A 3-kind 5-layer multilayer container shown in Table 2 was produced in the same manner as in Example 8, except that the ratio by mass of the deoxidant composition (b1-i) to the thermoplastic resin (b1-ii) in the oxygen-absorbing resin composition (b1), (b1-i)/(b1-ii) was changed to 80/20.

Example 11

A 3-kind 5-layer multilayer container shown in Table 2 was produced in the same manner as in Example 2, except that the total thickness of the multilayer sheet was changed to 0.5 mm and that the thickness ratio of each layer relative to the total thickness of the multilayer container was changed as shown in Table 2 so that the thickness ratio of the oxygen-permeable layer (A) relative to the total thickness of the multilayer container could be 32%.

Example 12

A 3-kind 5-layer multilayer container shown in Table 2 was produced in the same manner as in Example 11, except that the total thickness of the multilayer sheet was changed to 0.75 mm.

Example 13

A 3-kind 5-layer multilayer container shown in Table 2 was produced in the same manner as in Example 11, except that the total thickness of the multilayer sheet was changed to 1.2 mm.

Example 14

A 3-kind 5-layer multilayer container shown in Table 2 was produced in the same manner as in Example 11, except that the total thickness of the multilayer sheet was changed to 1.5 mm.

Example 15

A 3-kind 5-layer multilayer container shown in Table 2 was produced in the same manner as in Example 2, except that the ratio by mass of the deoxidant composition (b1-i) to the thermoplastic resin (b1-ii) in the oxygen-absorbing resin composition (b1), (b1-i)/(b1-ii) was changed to 43/57, that the ratio by mass of the oxygen-absorbing resin composition (b1) to the adhesive resin (b2), (b1)/(b2) was changed to 70/30, and that the thickness ratio of each layer relative to the total thickness of the multilayer container was changed as shown in Table 2 so that the thickness ratio of the oxygen-permeable layer (A) relative to the total thickness of the multilayer container could be 30%.

Comparative Example 1

A 3-kind 5-layer multilayer container shown in Table 2 was produced in the same manner as in Example 2, except that the ratio by mass of the deoxidant composition (b1-i) to the thermoplastic resin (b1-ii) in the oxygen-absorbing resin composition (b1), (b1-i)/(b1-ii) was changed to 30/70, that the ratio by mass of the oxygen-absorbing resin composition (b1) to the adhesive resin (b2), (b1)/(b2) was changed to 85/15, and that the thickness ratio of each layer relative to the total thickness of the multilayer container was changed as shown in Table 2 so that the thickness ratio of the oxygen-permeable layer (A) relative to the total thickness of the multilayer container could be 31%.

Comparative Example 2

A 3-kind 5-layer multilayer container shown in Table 2 was produced in the same manner as in Comparative Example 1, except that the ratio by mass of the deoxidant composition (b1-i) to the thermoplastic resin (b1-ii) in the oxygen-absorbing resin composition (b1), (b1-i)/(b1-ii) was changed to 5/95, and that the ratio by mass of the oxygen-absorbing resin composition (b1) to the adhesive resin (b2), (b1)/(b2) was changed to 30/70.

Comparative Example 3

A 3-kind 5-layer multilayer container shown in Table 2 was produced in the same manner as in Example 2, except that the ratio by mass of the deoxidant composition (b1-i) to the thermoplastic resin (b1-ii) in the oxygen-absorbing resin composition (b1), (b1-i)/(b1-ii) was changed to 30/70, and that the thickness ratio of each layer relative to the total thickness of the multilayer container was changed as shown in Table 2 so that the thickness ratio of the oxygen-absorbing adhesive layer (B) relative to the total thickness of the multilayer container could be 5%.

Comparative Example 4

Using a multilayer sheet molding apparatus including first to third extruders, a feed block, a T-die, a cooling roll and a sheet take-up unit but not using an oxygen-absorbing resin composition (b1), the polyamide X2 obtained in Production Example 2 was extruded out through the first extruder, a dry blend of homopolypropylene ("Novatec PP FY6" manufactured by Japan Polypropylene Corporation) and titanium oxide 60%-containing polypropylene-base white master batch (manufactured by Tokyo Ink Co., Ltd.) in 90/10 (ratio by mass) was through the second extruder, and, as an adhesive resin (b2), maleic anhydride-modified polypropylene ("Modic P604V" manufactured by Mitsubishi Chemical Corporation) was through the third extruder to produce a multilayer sheet (deoxidant multilayer body). The layer configuration of the multilayer sheet is composed of oxygen-permeable layer (A) (PP, inner layer)/adhesive layer (AD)/gas-barrier layer (C)/adhesive layer (AD)/protective layer (E) (PP, outer layer). The resultant sheet was thermoformed with the inner layer side thereof kept facing inward to produce 3-kind 5-layer multilayer containers shown in Table 2.

The total thickness and the ratio of each layer of the multilayer container were measured in the same manner as in Example 1.

The multilayer containers produced in Examples and Comparative Examples were evaluated in point of the appearance of the container, the oxygen transmission rate and the L-ascorbic acid remaining ratio, in the manner as below. The results are shown in Table 2.

(1) Appearance of Container

The appearance of each container was visually checked.

A: The inner surface and the outside of the container were smooth.

B: Roughness caused by iron powder was seen in the inner surface and on the outside of the container. Alternatively, the container deformed.

(2) Adhesiveness 100 mL of distilled water was filled in the multilayer container produced in Examples and Comparative Examples, and the mouth was hot-sealed with an aluminum foil laminate film to seal up the open spout. Using an autoclave ("SR-240" manufactured by Tomy Seiko Co., Ltd.), the container was subjected to retort treatment at 121° C. for 30 minutes. At this time, the container was checked for delamination. Those with no delamination were then stored in a thermostat chamber at 23° C. and 50% RH for 1 week, and then tested in a dropping test where the container was once dropped down to a concrete floor from a height of 100 cm. Depending on the presence or absence of delamination, the adhesiveness was evaluated. Three containers were tested under the same condition, and the adhesiveness thereof was evaluated.

A: After the dropping test, no delamination occurred at all.
B: After the retort treatment or the dropping test, delamination occurred in one or more containers.

(3) Oxygen Transmission Rate

The multilayer container was measured for the oxygen transmission rate with an oxygen permeability measuring apparatus ("OX-TRAN 2/61" manufactured by Mocon, Inc.) according to ASTM D3985. First, the multilayer container produced in Examples and Comparative Examples was subjected to retort treatment at 121° C. for 30 minutes, using an autoclave ("SR-240" manufactured by Tomy Seiko Co., Ltd.). Subsequently, 30 mL of distilled water was charged in the container, which was then hot-sealed with an aluminum foil laminate film to seal up the open spout. Two holes were formed in the aluminum foil-laminated film at the opening, through which copper tubes were inserted and fixed and sealed up with an epoxy resin-based adhesive ("Bond Quick Set" manufactured by Konishi Co., Ltd.). Subsequently, under the condition at a temperature of 23° C., a humidity outside the container of 50% RH and a humidity inside the container of 100% RH, this was stored for 12 hours, 3 days, 30 days and 60 days, and the oxygen transmission rate was measured after each storage.

(4) L-Ascorbic Acid Remaining Ratio 80 mL of a 10% L-ascorbic acid aqueous solution was charged in the multilayer container from the open spout thereof, and the open spout was sealed up by heat-fusing with an aluminum foil-laminated film. The container was subjected to retort treatment at 121° C. for 30 minutes by using an autoclave ("SR-240" manufactured by Tomy Seiko Co., Ltd.), and the container was stored in an atmosphere at 23° C. and 50% RH for three months.

Next, the content liquid was taken out, and 10 mL of the content liquid was placed in a tall beaker with a capacity of 100 mL, to which 5 mL of a mixed aqueous solution of metaphosphoric acid and acetic acid and 40 mL of distilled water were added. The solution was titrated with a 0.05 mol/L iodine solution as a titrant by an inflexion point detection method with a potentiometric titrator, and the L-ascorbic acid remaining ratio was obtained from the result thereof.

A higher L-ascorbic acid remaining ratio means that the container is excellent in suppressing oxidative degradation of the content thereof.

TABLE 2

| | Polyamide Resin (X) | Deoxidant Composition (b1-i) *1 mass % | Thermoplastic Resin (b1-ii) *1 mass % | Adhesive Resin (b2) *1 mass % | Multilayer Configuration *2 | Total Thickness of Sheet mm | Ratio of Protective Layer (E) % | Ratio of Oxygen-Absorbing Adhesive Layer (D) % | Ratio of Gas-Barrier Layer (C) % |
|---|---|---|---|---|---|---|---|---|---|
| Example 1 | X1 | 30 | 20 | 50 | A | 1 | 27 | 20 | 6 |
| Example 2 | X2 | 30 | 20 | 50 | A | 1 | 27 | 20 | 6 |
| Example 3 | X3 | 30 | 20 | 50 | A | 1 | 29 | 20 | 6 |
| Example 4 | X2 | 30 | 20 | 50 | A | 1 | 24 | 20 | 10 |
| Example 5 | X2 | 30 | 20 | 50 | A | 1 | 22 | 20 | 15 |
| Example 6 | X2 | 30 | 20 | 50 | A | 1 | 37 | 10 | 6 |
| Example 7 | X2 | 30 | 20 | 50 | A | 1 | 17 | 30 | 6 |
| Example 8 | X2 | 10 | 40 | 50 | A | 1 | 22 | 20 | 6 |
| Example 9 | X2 | 20 | 30 | 50 | A | 1 | 22 | 20 | 6 |
| Example 10 | X2 | 40 | 10 | 50 | A | 1 | 22 | 20 | 6 |
| Example 11 | X2 | 30 | 20 | 50 | A | 0.5 | 22 | 20 | 6 |
| Example 12 | X2 | 30 | 20 | 50 | A | 0.75 | 22 | 20 | 6 |
| Example 13 | X2 | 30 | 20 | 50 | A | 1.2 | 23 | 20 | 6 |
| Example 14 | X2 | 30 | 20 | 50 | A | 1.5 | 24 | 20 | 6 |
| Example 15 | X2 | 30.1 | 39.9 | 30 | A | 1 | 24 | 20 | 6 |
| Comparative Example 1 | X2 | 25.5 | 59.5 | 15 | A | 1 | 23 | 20 | 6 |
| Comparative Example 2 | X2 | 1.5 | 28.5 | 70 | A | 1 | 23 | 20 | 6 |
| Comparative Example 3 | X2 | 15 | 35 | 50 | A | 1 | 28 | 30 | 6 |
| Comparative Example 4 | X2 | 0 | 0 | 100 | B | 1 | 35 | 15 *5 | 6 |

| | Ratio of Oxygen-Absorbing Adhesive Layer (B) % | Ratio of Oxygen-Permeable Layer (A) % | Total of Layer Ratio % | Appearance of Container | Adhesiveness | Oxygen Transmission Rate *3 (mL/0.21 atm · day · package) | | | | L-Ascorbic Acid Remaining Ratio *4 % |
|---|---|---|---|---|---|---|---|---|---|---|
| | | | | | | 12 hr | 3 day | 30 day | 60 day | |
| Example 1 | 20 | 27 | 100 | A | A | 0.000 | 0.000 | 0.000 | 0.000 | 90 |
| Example 2 | 20 | 27 | 100 | A | A | 0.000 | 0.000 | 0.000 | 0.000 | 91 |
| Example 3 | 20 | 25 | 100 | A | A | 0.000 | 0.000 | 0.000 | 0.000 | 91 |
| Example 4 | 20 | 26 | 100 | A | A | 0.000 | 0.000 | 0.000 | 0.000 | 91 |
| Example 5 | 20 | 23 | 100 | A | A | 0.000 | 0.000 | 0.000 | 0.000 | 90 |
| Example 6 | 10 | 37 | 100 | A | A | 0.000 | 0.000 | 0.000 | 0.000 | 90 |
| Example 7 | 30 | 17 | 100 | A | A | 0.000 | 0.000 | 0.000 | 0.000 | 92 |

TABLE 2-continued

|  | *1 | *2 | | | *3 | *4 A | *4 B | *4 C |  |
| --- | --- | --- | --- | --- | --- | --- | --- | --- | --- |
| Example 8 | 20 | 32 | 100 | A | A | 0.002 | 0.000 | 0.000 | 0.000 | 87 |
| Example 9 | 20 | 32 | 100 | A | A | 0.001 | 0.000 | 0.000 | 0.000 | 89 |
| Example 10 | 20 | 32 | 100 | A | A | 0.000 | 0.000 | 0.000 | 0.000 | 94 |
| Example 11 | 20 | 32 | 100 | A | A | 0.003 | 0.002 | 0.001 | 0.000 | 85 |
| Example 12 | 20 | 32 | 100 | A | A | 0.001 | 0.000 | 0.000 | 0.000 | 89 |
| Example 13 | 20 | 31 | 100 | A | A | 0.000 | 0.000 | 0.000 | 0.000 | 92 |
| Example 14 | 20 | 30 | 100 | A | A | 0.000 | 0.000 | 0.000 | 0.000 | 92 |
| Example 15 | 20 | 30 | 100 | A | A | 0.000 | 0.000 | 0.000 | 0.000 | 91 |
| Comparative Example 1 | 20 | 31 | 100 | B | B | Unevaluated owing to appearance failure. | | | | |
| Comparative Example 2 | 20 | 31 | 100 | A | A | 0.008 | 0.007 | 0.003 | 0.003 | 77 |
| Comparative Example 3 | 5 | 31 | 100 | A | B | 0.002 | 0.000 | 0.000 | 0.000 | 88 |
| Comparative Example 4 | 15 *5 | 35 | 100 | A | A | 0.012 | 0.008 | 0.003 | 0.003 | 73 |

*1 Content (mass %) relative to 100 mass % of the material to constitute the oxygen-absorbing adhesive layer (B)
*2 Layer Configuration A (outer layer)PP/oxygen-absorbing adhesive layer/polyamide layer/oxygen-absorbing adhesive layer/PP(inner layer) B (outer layer)PP/AD/polyamide layer/AD/PP(inner layer)
*3 After retort treatment at 121° C. for 30 min, the container was measured at 23° C., at 50% RH outside the container and 100% RH inside the container.
*4 A, B, C: After retort treatment at 121° C. for 30 minutes, the container was stored at 23° C. and 50% RH for 3 months, and then measured.
*5 Adhesive layer (layer of maleic anhydride-modified polypropylene)

As shown in Table 2, in Comparative Example 1 where the content of the adhesive resin (B2) in the oxygen-absorbing adhesive layer (B) was less than 20% by mass relative to 100% by mass of the material constituting the oxygen-absorbing adhesive layer (B), the adhesiveness was insufficient, and the container deformed and caused appearance failure. In Comparative Example 2 where the content of the deoxidant composition (b1-i) in the oxygen-absorbing adhesive layer (B) is less than 5% by mass relative to 100% by mass of the material constituting the oxygen-absorbing adhesive layer (B), the oxygen-barrier performance and the oxygen absorbability were insufficient. In Comparative Example 3 where the thickness ratio of the oxygen-absorbing adhesive layer (B) relative to the total thickness of the multilayer container was too low, the adhesiveness was insufficient. In Comparative Example 4 where a simple adhesive layer not containing an oxygen-absorbing resin composition was used in place of the oxygen-absorbing adhesive layer, the oxygen-barrier performance and the oxygen absorbability were insufficient.

As opposed to these, the multilayer containers of the present invention of Examples 1 to 15 did not worsen in the appearance thereof on thermoforming and, in addition, the containers have oxygen-barrier performance and oxygen absorbability favorable for food packaging materials that are required thermal sterilization treatment.

INDUSTRIAL APPLICABILITY

The multilayer container of the present invention does not worsen in the appearance thereof on thermoforming and, in addition, the container has oxygen-barrier performance and oxygen absorbability favorable for food packaging materials that are required thermal sterilization treatment. The multilayer container of the present invention gives consumers improved convenience of alternatives to canned products, and the industrial value thereof is extremely high.

The invention claimed is:

1. A multilayer container having a layer configuration of 3 or more layers comprising, as layered in that order from an inner layer to an outer layer, an oxygen-permeable layer (A) containing an oxygen-permeable resin as the main component thereof, an oxygen-absorbing adhesive layer (B) containing, as the main components thereof, an oxygen-absorbing resin composition (b1) containing a deoxidant composition (b1-i) and a thermoplastic resin (b1-ii) and an adhesive resin (b2), and a gas-barrier layer (C) containing a gas-barrier resin as the main component thereof, wherein:
the gas-barrier resin is a polyamide resin (X) including a diamine unit containing a metaxylylenediamine unit in an amount of 70 mol % or more and a dicarboxylic acid unit containing 75 to 96 mol % of an α,ω-linear aliphatic dicarboxylic acid unit having 4 to 20 carbon atoms and 25 to 4 mol % of an aromatic dicarboxylic acid unit,
the content of the deoxidant composition (b1-i) in the oxygen-absorbing adhesive layer (B) is 5 to 50% by mass relative to 100% by mass of the material constituting the oxygen-absorbing adhesive layer (B), and the content of the adhesive resin (b2) is 20 to 70% by mass relative to 100% by mass of the material constituting the oxygen-absorbing adhesive layer (B), and
the thickness of the oxygen-absorbing adhesive layer (B) is 10 to 30% of the total thickness of the multilayer container.

2. The multilayer container according to claim 1, wherein an oxygen-absorbing adhesive layer (D) containing, as the main components thereof, an oxygen-absorbing resin composition (d1) containing a deoxidant composition (d1-i) and a thermoplastic resin (d1-ii) and an adhesive resin (d2) is layered as an outer layer of the gas-barrier layer (C), and a protective layer (E) containing a thermoplastic resin as the main component thereof is layered as an outer layer of the oxygen-absorbing adhesive layer (D).

3. The multilayer container according to claim 1, wherein the thickness of the oxygen-permeable layer (A) is 10 to 40% of the total thickness of the multilayer container.

4. The multilayer container according to claim 1, wherein the thickness of the gas-barrier layer (C) is 2 to 20% of the total thickness of the multilayer container.

5. The multilayer container according to claim 1, wherein the deoxidant composition (b1-i) for use in the oxygen-absorbing adhesive layer (B) is a deoxidant composition containing an iron powder as the main component thereof.

6. The multilayer container according to claim 5, wherein the maximum particle size of the iron powder is 0.5 mm or less, and the mean particle size thereof is 0.3 mm or less.

7. The multilayer container according to claim 1, wherein the thermoplastic resin (b1-ii) for use in the oxygen-absorbing adhesive layer (B) is a resin containing polypropylene as the main component thereof.

8. The multilayer container according to claim 1, wherein the thermoplastic resin (b1-ii) for use in the oxygen-absorbing adhesive layer (B) is a resin containing polypropylene as the main component thereof, and having received thermal history once or more in an extruder at a temperature not lower than the melting point of the resin.

9. The multilayer container according to claim 1, wherein the oxygen-permeable resin for use in the oxygen-permeable layer (A) is a polypropylene resin.

10. The multilayer container according to claim 2, wherein the thermoplastic resin for use in the protective layer (E) is at least one selected from the group consisting of a polypropylene resin, a polyamide resin and a polyester resin.

11. The multilayer container according to claim 2, wherein the thickness of the protective layer (E) is 15 to 60% of the total thickness of the multilayer container.

* * * * *